United States Patent [19]

Lawson et al.

[11] Patent Number: 5,223,153

[45] Date of Patent: Jun. 29, 1993

[54] IRON HYDROXIDE REMOVAL METHOD

[75] Inventors: Jimmie B. Lawson; David R. Thigpen, both of Houston, Tex.

[73] Assignee: Shell Oil Company, Houston, Tex.

[21] Appl. No.: 929,230

[22] Filed: Aug. 14, 1992

[51] Int. Cl.$^5$ .............................................. B01D 37/02
[52] U.S. Cl. .................................... 210/778; 210/777; 210/681; 210/688
[58] Field of Search ............... 210/778, 651, 777, 661, 210/681, 650, 688, 711, 687; 423/140; 106/600

[56] References Cited

U.S. PATENT DOCUMENTS

| | | | |
|---|---|---|---|
| 2,832,473 | 4/1958 | Oberholtzer | 210/777 |
| 3,259,571 | 7/1966 | Marshall et al. | 210/778 |
| 4,012,320 | 3/1977 | Conner et al. | 210/711 |
| 4,014,787 | 3/1977 | Shorr | 210/651 |
| 4,430,228 | 2/1984 | Paterson | 210/688 |

FOREIGN PATENT DOCUMENTS

| | | | |
|---|---|---|---|
| 4030937 | 8/1974 | Japan | 210/777 |
| 3315190 | 12/1988 | Japan | 210/778 |

OTHER PUBLICATIONS

Coogan, George J., "Iron and Manganese Removal Research with Diatomite Filters", Presented Jun. 19, 1961 at Purification Divsion, American Water Works Association, Philadelphia, Pa.

*Primary Examiner*—Robert A. Dawson
*Assistant Examiner*—Ana M. Fortuna
*Attorney, Agent, or Firm*—Del S. Christensen

[57] ABSTRACT

Calcium silicate filter aids have been found to be effective to remove colloidal iron suspensions from aqueous streams without plugging filters. Calcium silicate filter aid is made by heating diatomaceous earth with hydrous lime.

5 Claims, No Drawings

IRON HYDROXIDE REMOVAL METHOD

FIELD OF THE INVENTION

This invention relates to a method to remove iron hydroxide contaminates from aqueous streams.

BACKGROUND OF THE INVENTION

Iron hydroxide is particularly difficult to remove from water. Iron hydroxide is a gelatinous sticky substance that occupies much larger volumes than its concentration by weight would indicate. Consequently, it blinds faces of surface type filters and plugs depth filters. Diatomaceous earth is often used as a filter aid to remove solids and iron solids in particular from domestic water supplies and from oil field fluids, but with less than desirable results. Although effective to remove most solids, diatomaceous earth is not particularly effective at removing iron hydroxide due to the large amount of small particle size diatomaceous earth required and the rapid increase in pressure drop resulting from the large amount of diatomaceous earth.

Diatomaceous earth filters are operated by precoating a support with diatomaceous earth filter aid prior to service, and then additional diatomaceous earth body feed is added to the stream to be filtered. The body feed continuously renews the filter surface and keeps the filter cake permeable. Thus, sticky solids are removed without either plugging the filter surface or plugging the filter cake. Diatomaceous earth capable of filtering fine particles of iron hydroxide must be of relatively small particle size. Diatomaceous earth must also be used in relatively large quantities to prevent the iron hydroxide from plugging the filter cake. Mechanical removal of iron hydroxides requires that filter cakes have small pores to capture the iron hydroxide. Consequently, one has to use fine grades of diatomaceous earth, which causes high operating pressures, low filtration rates, and requires large capital investments in high surface area filters.

Brines used in well completions and work-overs tend to accumulate iron hydroxides due to exposure to iron containing tubulars. Such brines are used as many times as possible because weighing components, fluid loss additives and other chemical additives cost a considerable amount of money. Generally, the brines are filtered through diatomaceous earth filters to remove suspended solids. Iron hydroxides will tend to accumulate in the brines because of the difficulty of removing iron hydroxides. Brines containing more than about 10 mg/l of suspended solids, including iron hydroxides, are not suitable for use in completion and work-over. It would be desirable to have a filter medium which effectively and economically removes iron hydroxides from brines and other water mediums.

It is therefore an object of the present invention to provide a method that can reduce iron hydroxides (in aqueous mediums) to levels of 10 mg/l and less with good filtering rates.

SUMMARY OF THE INVENTION

These and other objects are accomplished by a method to remove iron hydroxides from an aqueous stream comprising more than about 10 mg/l of iron hydroxides, the method comprising the steps of:

contacting the aqueous stream with calcium silicate filter aid in an amount effective to reduce the amount of the iron hydroxides to a level of about 10 mg/l or less; and separating the calcium silicate filter aid from the aqueous stream recovering an aqueous stream comprising less than about 10 mg/l of iron hydroxide solids as caught on a 0.8 micron filter membrane.

Calcium silicate-containing filter aids have been found to remove colloidal irons from water mediums efficiently. High filter rates and high levels of iron hydroxide removal are maintained for acceptably long run lengths. Preferred filter aids include MICRO CEL-C and SILISORB, both available from Celite Corp. Total iron in streams containing about 0.5 ppm total Fe can be reduced to less than 0.1 ppm total iron by filtration with calcium silicate filtering aids.

DETAILED DESCRIPTION OF THE INVENTION

Calcium silicates of the present invention are preferably prepared by slurrying calcined diatomaceous earth with lime and steam. The resultant calcium silicate will be porous and will function as an effective filter aid. Commercially available calcium silicates acceptable for the practice of the present invention include MICRO CEL-C and SILISORB, both available from Celite Corp. These calcium silicates are generally used in the food and cosmetics industries to prevent caking of powders.

Filtering of liquids to reach low levels of solids when extremely small particle sizes must be removed is preferably accomplished with a precoat filter. The calcium silicate filter aid is either a precoat or used as a feed body filter. Body feeds are slurried with the fluid to be filtered to provide an increasing depth of filter cake and reduce the tendency of the filter plugging at the filter surface. The filters may be batch or continuous filters. For example, parallel plate filters, Nutsche filters, rotary, or vertical or horizontal tubular filters can be used. Because the calcium silicate filter aid can be used as a body filter aid, cartridge or other types of filters which are not precoat filters may also be utilized in the practice of the present invention.

Water to be filtered by the present invention can be brine or well water to be used in completion or work-over fluids. The invention is not limited to such uses for the filtered water, and this method to remove iron hydroxides can be used to improve drinking water, or as a pretreatment for boiler feedwater.

When the calcium silicate of the present invention is used as a body feed, between about 1.0 and about 1000.0 ppm by weight of the water to be filtered can be used. Greater amounts will result in excessive material costs and unnecessary increases in filter pressure drops. Lesser amounts may not be sufficient to remove iron hydroxides from the water to be filtered. When the calcium silicate of the present invention is used without body feed, between about 0.05 and about 0.2 pounds of calcium silicate filter aid per square foot of filter area is preferred.

EXAMPLES

Twelve tests were performed to test various filter aids in a laboratory scale filter. The results of these tests are below in Table 1. Tests 1 and 2 both used commercially available calcium silicate filter aids. The other ten tests used diatomaceous earth filter aids. The laboratory filter was about 47 mm in diameter, with a porous glass filter support. An 8 micron pad was placed over the filter support, and then 0.2 inches of the filter aid was placed on the pad. Iron containing water was then passed through the filter. In most tests, body feed of 10 ppm of the filter aid was mixed with the water prior to passing the water through the filter. Tests 4, 5, 7, and 9 did not contain body feed, the others did. Table 1 lists the suppliers of the filter aids. The supplier was either Celite Corp. ("CC") or Eagle Pitcher Corp. ("EP"). The iron containing water was well water to which about 0.78 weight percent sodium chloride was added. The water of test 1 was of an initial total iron content of about 0.34 ppm by weight. The water of the other tests were of an initial total iron content of about 0.34 ppm by weight.

TABLE 1

| Test | Filter Aid | Manf. | Size Microns | Total Fe ppm | Rate gal/ft$^2$ min-psi |
|---|---|---|---|---|---|
| 1 | SILISORB | CC | 19.3 | 0.09 | 0.70 |
| 2 | MICRO CEL C | CC | 16.2 | 0.07 | 0.408 |
| 3 | SUPER AID | EP | N/Avail. | 0.23 | TLTM |
| 4 | SPEED FLO | EP | N/Avail. | 0.35 | TLTM |
| 5 | FW-14 | EP | N/Avail. | 0.40 | TLTM |
| 6 | FILTER CEL | CC | 14.0 | 0.08 | 0.11 |
| 7 | FILTER CEL | CC | 14.0 | 0.07 | TLTM |
| 8 | CELLITE 577 | CC | 14.6 | 0.19 | TLTM |
| 9 | Standard SUPER CEL | CC | 15.4 | 0 28 | TLTM |
| 10 | FP-2 | EP | 14.0 | 0.08 | 0.23 |
| 11 | FP-4 | EP | N/Avail. | 0.12 | 0.62 |
| 12 | FW-6 | EP | N/Avail. | 0.19 | 1.20 |

Table 1 indicates that total iron content of filtered water was fairly low for the tests with calcium silicate filter aids, and some of the tests using diatomaceous earth filter aids. But the tests using diatomaceous earth filter aids that resulted in low total iron contents resulted in filter rates that were low or to low to measure (TLTM). Only the calcium silicate filter aids resulted in both high filter rates and low total iron in the resultant filtered water.

Some of the filter aids utilized in the laboratory tests were then tested on an 800 ft$^2$ parallel plate filter press to remove iron from a stream of well water. Table 2 below includes the results of these tests. The water initially contained about 1.6 ppm by weight of solids and about 0.44 ppm of ferric iron. Only the tests utilizing calcium silicate filter aids resulted in useful amounts of water being filtered prior to the filter plugging.

TABLE 2

| Filter Aid | Amt. Lbs. | Body Feed ppm | Filtered Vol. BBLS | Tot. Solids ppm | Fe ppm | Delta P psi |
|---|---|---|---|---|---|---|
| FILTER CEL | 25 | 0 | 149 | 0.1 | 0.04 | 25+ |
| FP-2 | 37.5 | 0 | 22.1 | — | 0.19 | — |
| FP-2 | 37.5 | 0 | 28.7 | — | 0.14 | 5.4 |
| SILISORB | 35 | 75 | 732 | 0.2 | 0.11 | 6.2 |
| MICRO CEL C | 25 | 75 | 946 | 0.2 | 0.06 | 11.9 |
| MICRO CEL C | 25 | 75 | 883 | 0.2 | 0.03 | 12.8 |

The foregoing description and examples of the invention is explanatory of the invention, and various changes in detail of the described invention may be made within the scope of the following claims.

We claim:

1. A method to remove iron hydroxides from an aqueous stream comprising more than about 10 mg/l of iron hydroxides, the method comprising the steps of:

contacting the aqueous stream with calcium silicate filter aid in an amount effective to reduce the amount of the iron hydroxides to a level of about 10 mg/l or less;

separating the calcium silicate filter aid and at least a portion of the iron hydroxides from the aqueous stream; and recovering an aqueous stream comprising less than about 10 mg/l of iron hydroxide solids as caught on a 0.8 micron filter membrane.

2. The method of claim 1 wherein the recovered aqueous stream comprises about 10 mg/l or less of total solids.

3. The method of claim 1 wherein the calcium silicate filter aid is separated from aqueous stream by a precoat filter apparatus.

4. The method of claim 1 wherein the aqueous stream is a brine used as a drilling fluid or a work-over fluid.

5. The method of claim 3 wherein the aqueous stream is a brine used as a drilling fluid or a work-over fluid.

* * * * *